United States Patent
Flydalen

(10) Patent No.: US 11,942,826 B2
(45) Date of Patent: Mar. 26, 2024

(54) ELECTRIC MACHINE COOLING

(71) Applicant: Rolls-Royce Electrical Norway AS, Trondheim (NO)

(72) Inventor: Ken Flydalen, Trondheim (NO)

(73) Assignee: Rolls-Royce Electrical Norway AS, Trondheim (NO)

( * ) Notice: Subject to any disclaimer, the term of this patent is extended or adjusted under 35 U.S.C. 154(b) by 265 days.

(21) Appl. No.: 17/448,762

(22) Filed: Sep. 24, 2021

(65) Prior Publication Data

US 2023/0095216 A1    Mar. 30, 2023

(51) Int. Cl.
*H02K 1/2706* (2022.01)
*B64D 27/24* (2006.01)
*H02K 1/32* (2006.01)
*H02K 9/06* (2006.01)

(52) U.S. Cl.
CPC ........... *H02K 1/2706* (2013.01); *B64D 27/24* (2013.01); *H02K 1/32* (2013.01); *H02K 9/06* (2013.01)

(58) Field of Classification Search
CPC .......... H02K 1/2706; H02K 1/32; H02K 9/06; H02K 7/083; H02K 1/278; B64D 27/24; B64D 33/08
USPC .................................................... 310/54, 156
See application file for complete search history.

(56) References Cited

U.S. PATENT DOCUMENTS

| | | | |
|---|---|---|---|
| 1,691,696 A * | 11/1928 | Baum | H02K 9/19 310/54 |
| 5,944,497 A | 8/1999 | Kershaw et al. | |
| 6,011,331 A | 1/2000 | Gierer et al. | |
| 8,659,190 B2 * | 2/2014 | Chamberlin | H02K 5/203 310/52 |
| 2004/0036367 A1 | 2/2004 | Denton et al. | |
| 2005/0206251 A1 * | 9/2005 | Foster | B60K 6/445 310/59 |
| 2010/0164310 A1 * | 7/2010 | Dames | H02K 9/197 29/598 |
| 2010/0231066 A1 * | 9/2010 | Korner | H02K 9/06 310/61 |
| 2011/0241350 A1 * | 10/2011 | Kori | H02K 1/20 290/55 |
| 2022/0042458 A1 * | 2/2022 | Long | F02C 7/12 |
| 2022/0337125 A1 * | 10/2022 | Dang | H02K 1/2766 |
| 2023/0095215 A1 * | 3/2023 | Cheaz | G06F 16/958 707/728 |
| 2023/0095216 A1 * | 3/2023 | Flydalen | H02K 7/083 310/156.01 |
| 2023/0108862 A1 * | 4/2023 | Høyland | H02K 1/20 310/216.113 |

FOREIGN PATENT DOCUMENTS

| | | | |
|---|---|---|---|
| CA | 2416485 | * | 7/2003 |
| EP | 2757666 | * | 7/2014 |
| JP | 2017143737 A | | 8/2017 |
| WO | WO 2017050447 | * | 3/2017 |

* cited by examiner

*Primary Examiner* — Ahmed Elnakib

(74) *Attorney, Agent, or Firm* — Shumaker & Sieffert, P.A.

(57) ABSTRACT

An example rotor assembly includes a rotor core having an axial length and configured to rotate about a longitudinal axis. The rotor core includes a first wall and a second wall radially within the first wall and defining a fluid flow path configured to guide a fluid along an inner surface of the first wall.

18 Claims, 5 Drawing Sheets

ELECTRIC MACHINE COOLING

TECHNICAL FIELD

This disclosure relates to electric machines.

BACKGROUND

Electric machines convert between electrical energy and mechanical energy. As one example, an electric machine may operate as a generator that converts mechanical energy into electrical energy. As another example, an electric machine may operate as an electrical motor that converts electrical energy into mechanical energy. Electric machines typically include a rotor that rotates within a stator. Energy flows through the stator to or from the rotor. In an electric motor, the stator provides a rotating magnetic field that drives the rotor. In a generator, the stator converts a rotating magnetic field to electric energy.

SUMMARY

In one example, this disclosure describes a rotor assembly including a rotor core having an axial length and configured to rotate about a longitudinal axis, the rotor core including a first wall; and a second wall radially within the first wall and defining a fluid flow path configured to guide a fluid along an inner surface of the first wall.

In another example, this disclosure describes an electric machine including a stator defining a volume; and a rotor assembly configured to rotate within the volume; the rotor assembly including a rotor core having an axial length and configured to rotate about a longitudinal axis, the rotor core including a first wall; and a second wall radially within the first wall and defining a fluid flow path configured to guide a fluid along an inner surface of the first wall.

In another example, this disclosure describes a method of making a rotor assembly including attaching a wall to an inner surface of a rotor core via an impeller, wherein the wall defines a fluid flow path configured to guide a fluid along an inner surface of the rotor core.

The details of one or more examples are set forth in the accompanying drawings and the description below. Other features, objects, and advantages will be apparent from the description and drawings, and from the claims.

DETAILED DESCRIPTION

Figure 1:
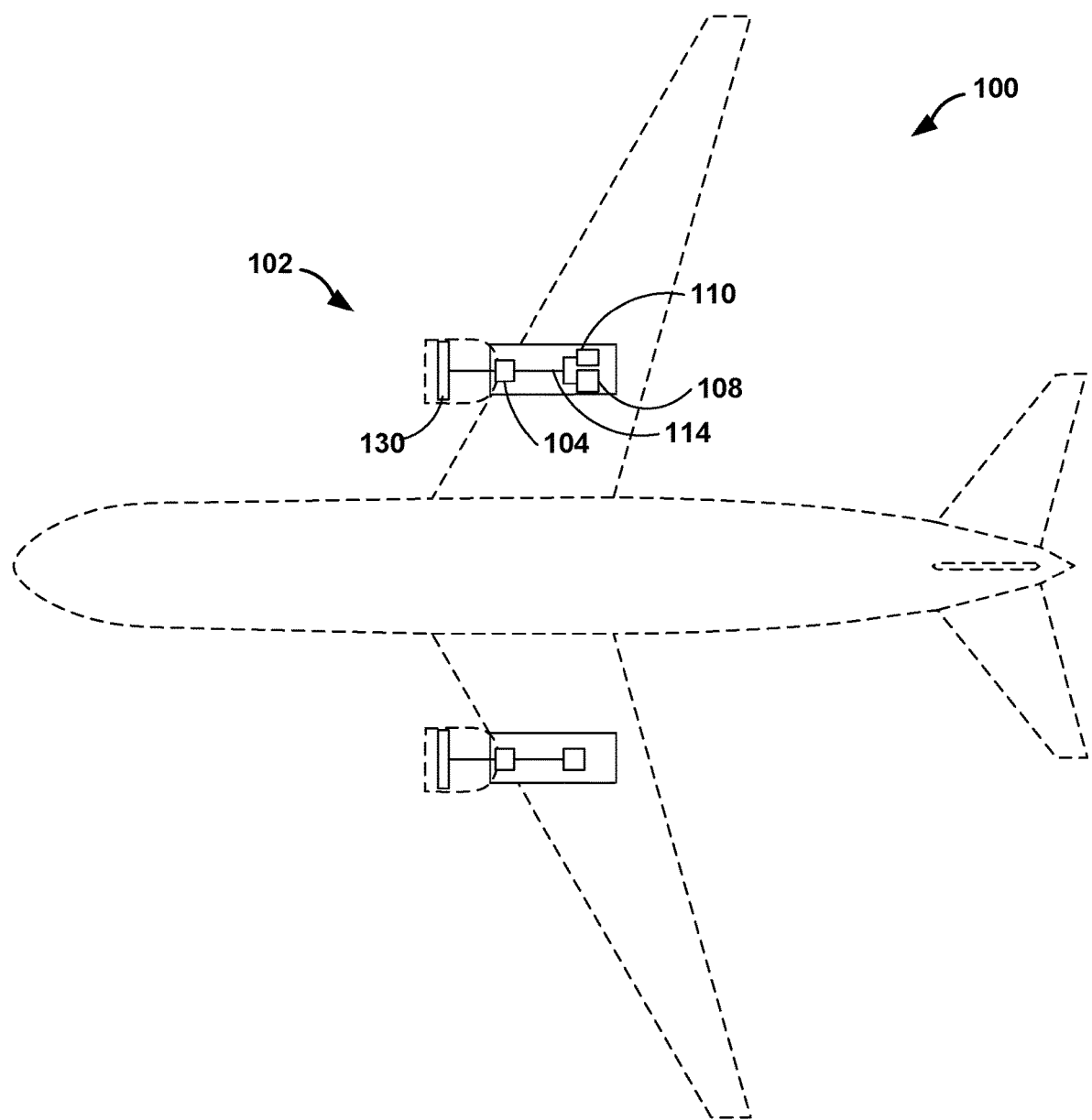
FIG. 1 is a conceptual diagram of a vehicle that includes an electric machine, in accordance with one or more techniques of this disclosure.

Electric machines may be used to provide energy to, or extract energy from, rotating devices. As one example, an electrical generator may convert rotational mechanical energy extracted from a combustion motor into electrical energy. As another example, an electrical motor may provide rotational mechanical energy to assist with starting a combustion motor. As another example, an electrical motor may provide rotational mechanical energy to drive a propulsor (e.g., fan, propeller, etc.) of a vehicle. An electric machine may operate in various modes at different times. For instance, a particular electric machine may operate as a starter to start a combustion motor at a first time and operate as a generator to convert rotational mechanical energy generated by the combustion motor into electrical energy at a second time. In this way, an electric machine may operate as an electrical starter-generator.

An electric machine may include a rotor that rotates relative to a stator. The rotor may include magnets, e.g., permanent magnets (PMs), disposed around a cylindrical body of the rotor. Magnetic fields of the magnets of the rotor interact with magnetic fields generated by windings included in the stator to transfer energy. The stator may transfer energy to, or receive energy from, the rotor via interaction between magnetic fields generated by the stator windings and magnetic fields generated by the rotor. For example, an alternating current may be applied to the stator windings in a motor which may cause alternating magnetic fields. Interaction between magnetic fields generated by the magnets of the rotor and the alternating magnetic fields may transfer and convert the electrical energy in the stator windings to mechanical motion (e.g., rotation) of the rotor. Similarly, rotation of the rotor in a generator may cause alternating magnetic fields which may transfer and convert the mechanical energy of the motion of the rotor to electrical energy in the stator windings via induction of a current in the windings by the alternating magnetic fields.

Electric machines have energy losses in transferring energy between rotation mechanical energy and electrical energy or from electrical energy to rotational mechanical energy. These losses ultimately are converted to heat which increases the temperature of the components of the machine, which may then change the performance and characteristics of the electric machine and/or degrade components of the electric machine.

In accordance with one or more techniques of this disclosure, a rotor assembly includes a wall radially within a rotor core, the wall defining a fluid flow path configured to guide a fluid along an inner surface of the rotor core to cool the rotor core. The fluid flow path is configured to guide a fluid from a fluid inlet to the rotor assembly to a fluid outlet from the rotor assembly, and in some examples, further to a fluid outlet from an electric machine including the rotor assembly. The fluid may be configured to cool the rotor assembly by transferring heat from the rotor assembly while flowing within the fluid flow path.

The rotor assembly may include the fluid inlet, which may be a hollow shaft attached to, or integral with, the rotor core. The hollow shaft may define a lumen configured to be in fluid communication with the portion of the fluid flow path within the rotor core. The wall within the rotor core may be configured to guide a fluid within the fluid flow path from the lumen of the hollow shaft and along an inner surface of the rotor core rotor core. In other words, the rotor core may be a "double-walled" hollow rotor core with the double walls defining a volume between them comprising a portion of the fluid flow path within the rotor core.

The rotor core may include a rotor core exit vent, which may be a through hole in fluid communication with the fluid flow path and a volume within, and defined, by a stator. In other words, the rotor assembly may be comprise a portion of an electric machine and may be configured to rotate with a volume defined by the stator of the electric machine. The stator and rotor assembly may be configured to define a portion of the fluid flow path radially outside of the rotor core and radially within the stator. The portion of the fluid flow path outside of the rotor core and inside the rotor core may be in fluid communication via the rotor core exit vent. The stator may further define a stator exit vent, which may be the outlet, and which may be configured to allow a fluid flowing within the flow path to flow out of the stator and out of the electric machine. The rotor assembly and stator may define a portion of the fluid flow path configured to guide a fluid along an inner surface of the stator from the rotor core exit vent to the stator exit vent, e.g., the outlet. For example, a fluid flowing within such portion of the fluid flow path may cool and/or transfer heat from both the rotor assembly (e.g., via thermal contact with rotor assembly components located radially outside the rotor core such as permanent magnets, banding, and the like) and the stator, e.g., via thermal contact with an inner surface of a stator sleeve.

The rotor core may further include an impeller, or a plurality of impellers, between the inner surface of the rotor core and the wall, the impeller(s) configured to cause a fluid to move within the fluid flow path. In other words, the rotor core may include impellers between the double-walls of the double-walled rotor core. The impeller(s) may be configured to cause the fluid to flow within the fluid flow path when the rotor core is rotated. For example, the rotational motion of the impeller(s) with the rotor core is rotated may cause a pressure differential of the fluid from the inlet to the outlet, causing the fluid to be drawn in at the inlet (e.g., the hollow shaft) and exit at the outlet (e.g., the stator exit vent). In some examples, the impeller(s) may be further configured to stiffen and/or support the wall, e.g., provide mechanical support for the double-walled rotor core.

FIG. 1 is a conceptual diagram of a vehicle 100 that includes an electric machine, in accordance with one or more techniques of this disclosure. In some examples, vehicle 100 is an aircraft. In other examples, vehicle 100 may include any type of vehicle utilizing an electric machine, including one or more types of air vehicles; land vehicles, including but not limited to, tracked and/or wheeled vehicles; marine vehicles, including but not limited to surface vessels, submarines, and/or semi-submersibles; amphibious vehicles; or any combination of one or more types of air, land, and marine vehicles. Vehicle 100 may be manned, semiautonomous, or autonomous.

As shown in the example of FIG. 1, vehicle 100 may include propulsion system 102. In some examples, propulsion system 102 may include a combustion engine, such as a gas-turbine engine. Propulsion system 102 includes motor 104 that is configured to drive propulsor 130. Propulsion systems that include gas-turbine engines may include electric generator 108 that may both start the gas-turbine engines and generate electrical power using mechanical energy generated by the gas-turbine engines. As shown in FIG. 1, propulsion system 102 may include generator 108 and energy storage system (ESS) 110 coupled to electrical bus 114, and motor 104 coupled to electrical bus 114.

In accordance with one or more techniques of this disclosure, motor 104 and/or generator 108 may include a wall radially within a rotor core, the wall defining a fluid flow path configured to guide a fluid along an inner surface of the rotor core to cool the rotor core. The fluid flow path is configured to guide a fluid from a fluid inlet to the rotor assembly to a fluid outlet from the rotor assembly, and in some examples, further to a fluid outlet from an electric machine including the rotor assembly. The fluid may be configured to cool the rotor assembly by transferring heat from the rotor assembly while flowing within the fluid flow path.

Figure 2:
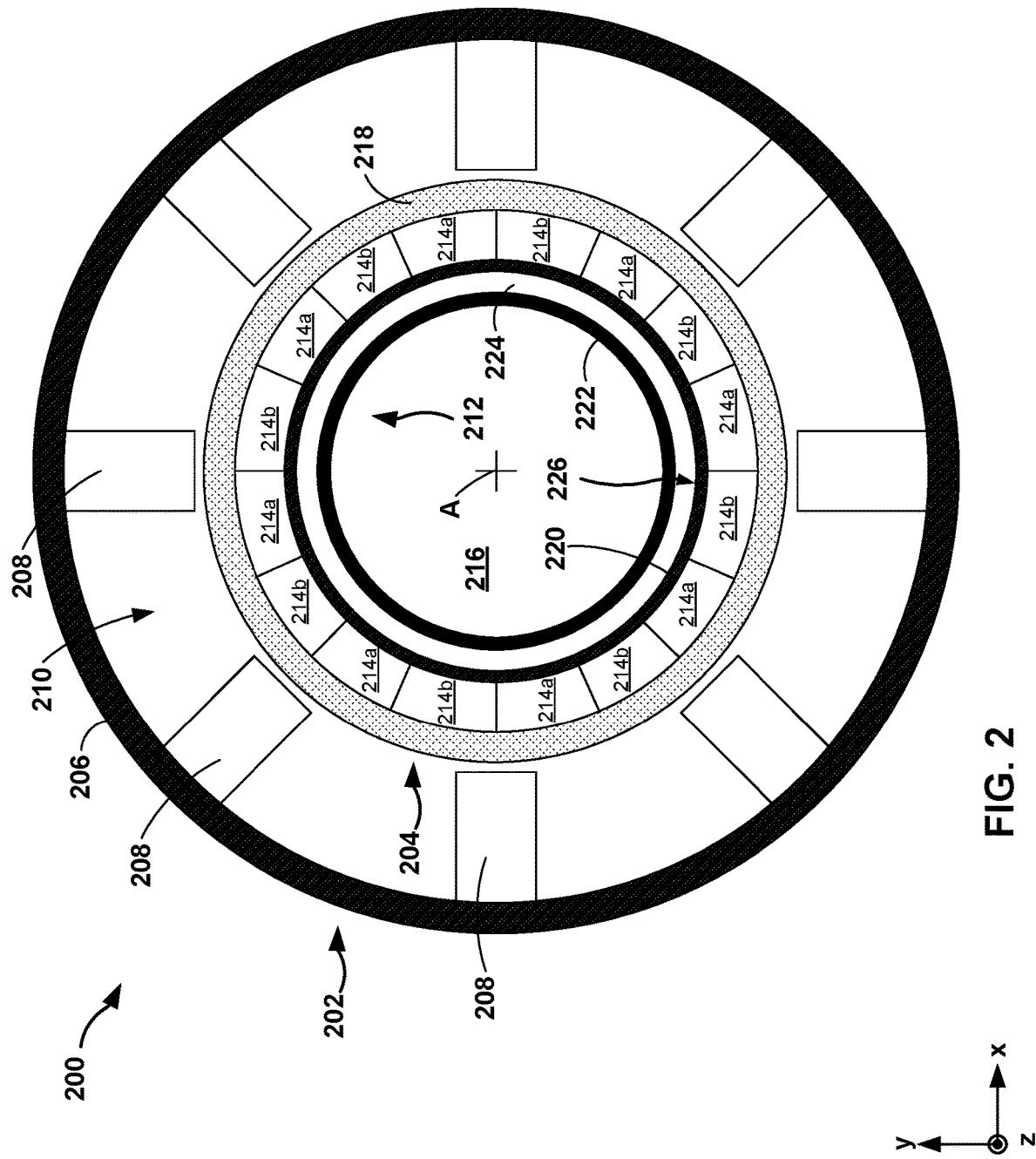
FIG. 2 is a cross-sectional view of an electric machine, in accordance with one or more techniques of this disclosure.

FIG. 2 is a cross-sectional view of an electric machine 200 as viewed along axis A, in accordance with one or more techniques of this disclosure. In some examples, the cross-sectional view may correspond to a cross section at the plane defined by circumference C illustrated in FIG. 3, with respect to electric machine 300. In the example shown, electric machine 200 includes stator 202 and rotor assembly 204. In some examples, electric machine 200 may be either, or both, of an electric generator configured to convert mechanical energy to electrical energy or an electric motor configured to convert electrical energy to mechanical energy.

In the example shown, stator 202 includes base portion 206 and a plurality of stator teeth 208. Stator teeth 208 may project radially inward towards longitudinal axis A of rotor assembly 204 from base portion 206. In some examples, the plurality of stator teeth 208 may be disposed circumferentially around longitudinal axis A, e.g., about the z-axis as illustrated. In some examples, stator 202 may have a length that is substantially the entire length of electric machine 200 and/or rotor assembly 204, e.g., along longitudinal axis A in the z-direction. In other examples, electric machine 200 may include a plurality of stators 202 disposed along a longitudinal axis A in the z-direction, each stator 202 having a length that is substantially less than the length of electric machine 200 and/or rotor assembly 204. In some examples, stator teeth 208 may define a plurality of slots 210 between stator teeth 208. A plurality of stator windings (not shown) may be wound around the plurality of stator teeth 208 and at least partially filling stator slots 210.

In the example shown, rotor assembly 204 includes rotor core 212, a plurality of magnet pairs 214a and 214b of opposite polarity (collectively referred to as magnets 214) disposed on or about the surface of rotor core 212, and metallic banding 218. As used herein, magnets of the "same polarity" have their magnetic poles oriented in the same direction, and magnets of the "opposite polarity" have their magnetic poles oriented in opposite directions. Namely, magnets do not have a particular polarity, but rather an orientation of their magnetic poles. For ease of description, magnets described as having the "same polarity" or "opposite polarity" relative to each other as used herein means that the magnets are oriented with like poles (e.g., their magnetic north and south poles) oriented in the same direction or opposite direction, respectively, relative to each other. For example, the magnetic north and south poles of magnets 214a and 214b may be oriented opposite to each other such that the north magnetic pole of magnet 214a may be at the end of magnet 214a in the positive z-direction and its south magnetic pole may be at its end in the negative z-direction, and the opposite may be true for magnet 214b.

Metallic banding 218 may be configured to secure magnets 214 to an outer surface of rotor core 212. In some examples, there may be one or more layers between the outer surface of rotor core 212 and magnets 214. For example, metallic banding 218 may be configured to secure magnets 214 to an outer surface of one or more layers disposed on an outer surface of rotor core 212, e.g., an adhesive, a wrap, or any other material forming a layer between magnets 214 and the outer surface of rotor core 212.

In some examples rotor core 212 may be a hollow shell and/or drum, e.g., volume 216 may be hollow. In some examples, rotor core 212 may be solid core, e.g., volume 216 may be a substantially solid material, e.g., a metal. In some examples, rotor core 212 may be and/or include a drive shaft, or rotor core 212 may be mechanically coupled to a drive shaft in other examples.

When electric machine 200 is operating as a generator, a torque may be applied to rotor assembly 204, e.g., via rotor core 212 as a drive shaft. The rotation of rotor assembly 204 may cause an alternating magnetic field at each of stator teeth 208 due to the rotation of the magnet pairs 214*a* and 214*b*. The alternating magnetic fields may induce a current, e.g., and alternating current (AC) to flow in the windings of stator 202, thereby converting the mechanical energy (rotation) of the rotor into electrical energy in the windings. When electric machine 200 is operating as a motor, the opposite conversion may occur. Namely, AC flowing through the windings of stator 202 may cause alternating magnetic fields, which interact with magnets 214 to induce a torque on rotor assembly 204 thereby converting the electrical energy in the windings to mechanical energy of the rotor assembly.

In some examples, the alternating magnetic fields may induce eddy currents in conductors located within the fields, e.g., magnets 214, metallic banding 218, etc. To reduce eddy currents, magnets 214 (e.g., each of the magnets 214*a* and 214*b* about the circumference of rotor core 212) and metallic banding 218 may be segmented in the axial direction into a plurality of segmented magnets 214 and a plurality of segmented metallic bands 218, e.g., along longitudinal axis A in the z-direction. Electrical resistance of the magnets, or any material in which eddy currents may be induced, may cause at least a portion of the energy coupled into the eddy currents to be converted to heat. Electric machine 200 may include other sources of heat, desired or undesired, as well. For example, air resistance and/or friction may convert rotational energy of rotor assembly 204 to heat, e.g., increasing the temperature of magnets 214 and/or other components of rotor assembly 204.

In accordance with one or more techniques of this disclosure, rotor assembly 204 may include rotor core 212 including a wall 222 radially within the rotor core 212 defining a fluid flow path 224 configured to guide a fluid along an inner surface 226 of rotor core 212. In the example shown, rotor core 212 includes a first, outer wall 220 and a second, inner wall 222, together defining fluid flow path 224. In some examples, rotor core 212, e.g., outer wall 220, is configured to conduct heat between permanent magnets 214*a*, 214*b* and inner surface 226 of outer wall 220, and the inner surface 226 is configured to transfer heat to a fluid flowing within fluid flow path 224.

Figure 3:
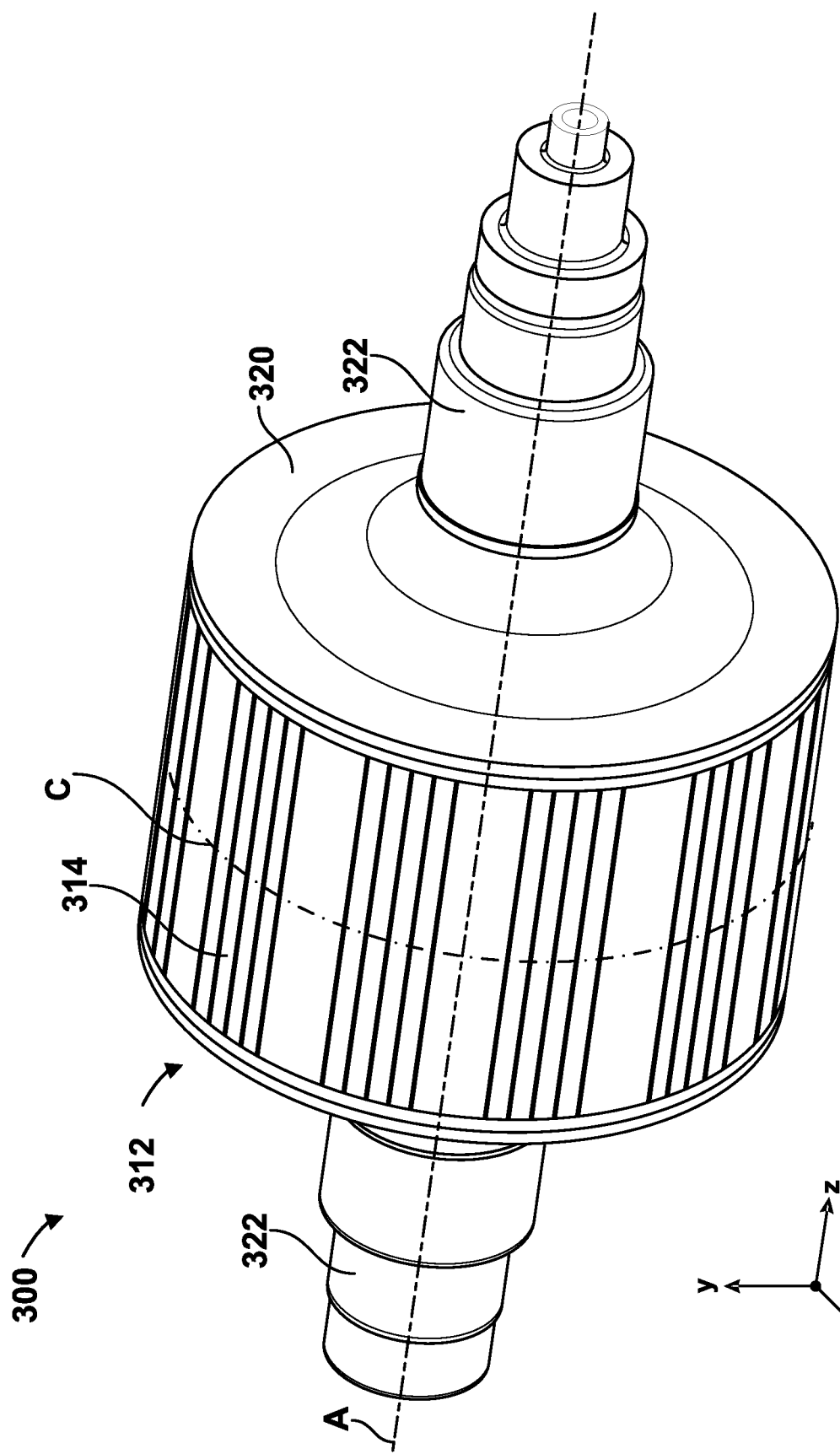
FIG. 3 is a perspective view of a rotor assembly, in accordance with one or more techniques of this disclosure.

FIG. 3 is a perspective view of a rotor assembly 300, in accordance with one or more techniques of this disclosure. In the example shown, rotor assembly 300 includes rotor shaft 322, rotor core 312, permanent magnets 314.

Rotor shaft 322 is configured to support rotor core 312 and contact one or more bearings to rotate about longitudinal axis A. Rotor shaft 322 is made of a hard material, e.g., a metal, and has a smooth surface finish at least in the areas that contact one or more bearings so as to minimize friction and/or resistance to rotation. In some examples, rotor shaft 322 may be integral with, or a part of, rotor core 312.

Rotor core 312 is configured to support permanent magnets 314 at a radial distance from axis A, e.g., so as to efficiently interact with a stator via alternating magnetic fields (either as a generator or motor). Rotor core 312 may be a double-walled rotor core, e.g., comprising a radially outer wall 320 and a radially inner wall (not visible in FIG. 3) that together define a fluid flow path configured to guide a fluid along an inner surface of the outer wall 320.

Figure 4:
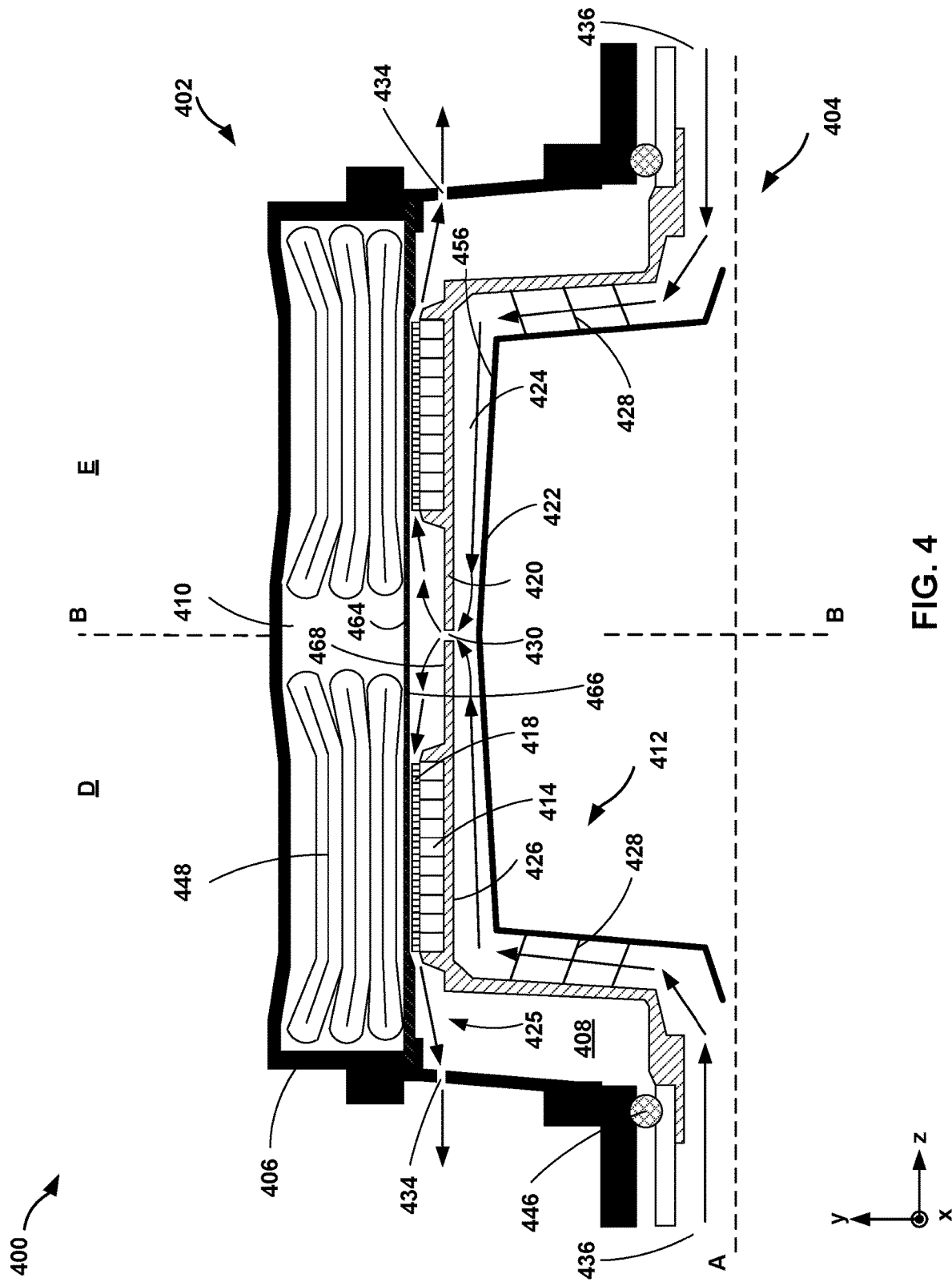
FIG. 4 is a cross-sectional view of a portion of an example rotor assembly, in accordance with one or more techniques of this disclosure.

FIG. 4 is a cross-sectional view of a portion of an example electric machine 400, in accordance with one or more techniques of this disclosure. The cross-sectional view shown is of a portion of electric machine 400 as viewed in the radial direction. It should be appreciated that the view shown in FIG. 4 may be a portion of electric machine 400 that may be symmetric about axis A, e.g., a portion of the "top half" of electric machine 400.

In the example shown, electric machine 400 includes stator 402 and rotor assembly 404. In some examples, electric machine 400 may be either, or both, of an electric generator configured to convert mechanical energy to electrical energy or an electric motor configured to convert electrical energy to mechanical energy.

In the example shown, stator 402 includes stator housing 406 and conductors 448. Conductors 448 may be stator windings, e.g., wound around a plurality of stator teeth (not shown). Stator housing 406 may be configured to both support conductors 448 and position conductors 448 at a radial distance from permanent magnets 414 of rotor assembly 404, as well as fluidically isolate volume 410, e.g., including conductors 448, from rotor assembly 404 and/or a volume in which rotor assembly 404 is configured to rotate. In some examples, stator housing 406 may be configured to contain a fluid within volume 410, e.g., a cooling oil, air, water, a gas, a refrigerant, and the like, and prevent the fluid from entering into the volume in which rotor assembly 404 is configured to rotate.

Stator housing 406 is configured to house rotor assembly 404. For example, rotor assembly 404 is configured to rotate within stator 402, e.g., via bearings 446 between stator housing 406 and rotor assembly 404. In the example shown, rotor assembly 404 is configured to rotate within volume 408 defined by stator 402 and to rotate about longitudinal axis A. Stator housing 406 may include one or more stator exit vents 434 configured to be in fluid communication with both volume 408 and a volume outside of stator housing 406. Stator exit vents 434 are configured to allow a fluid to flow between volume 408 and the volume outside of stator housing 406.

In the example shown, rotor assembly 404 includes rotor core 412, a plurality of magnets 414 disposed on or about the surface of rotor core 412, and metallic banding 418. Magnets 414 and metallic banding 418 may be substantially similar to magnets 214 and metallic banding 218 described above.

In the example shown, rotor core 412 is a double-walled hollow core. Rotor core 412 may be comprised of a rigid material that may be electrically conductive or electrically non-conductive, e.g., a metal, a carbon fiber, a composite material, and the like. Rotor core 412 has an axial length along longitudinal axis A, and is configured to rotate about longitudinal axis A. Rotor core 412 comprises first, outer wall 420 and second, inner wall 422. Inner wall 422 is disposed radially within outer wall 420, e.g., towards longitudinal axis A. Outer wall 420 (e.g., an inner surface 426 of outer wall 420) and inner wall 422 (e.g., an outer surface of inner wall 422) define fluid flow path 424. Fluid flow path 424 is configured to guide a fluid along an inner surface 426 of outer wall 420, e.g., so as to flow along surface 426 and remove heat from outer wall 420. In some examples, one or both of outer wall 420 and inner wall 422 may comprise a thermally conductive material, e.g., a metal, a thermally conductive carbon fiber, a thermally conductive polymeric material including thermally conductive particles, a thermally conductive woven or nonwoven material including thermally conductive polymers, a thermally conductive composite material, or the like.

In the example shown, rotor core 412 optionally includes one or more impellers 428 between inner surface 426 of outer wall 420 and an outer surface of inner wall 422, e.g., within fluid flow path 424. Impellers 428 are configured to cause a fluid to move within fluid flow path 424. For example, as rotor assembly 404 rotates, impellers 428 move rotationally within fluid flow path 424, contacting and causing the fluid within fluid flow path 424 to accelerate, e.g., in the direction shown via the directional arrows within fluid flow path 424 illustrated in FIG. 4. In other examples, impellers 428 may be configured to cause a fluid to move in the opposite direction of the arrows within fluid flow path 424 illustrated in FIG. 4.

In some examples, impellers 424 are configured to affix or support inner wall 422 radially within outer wall 420. For example, impellers 424 may be configured to be structural attachments between inner wall 422 and outer wall 420 and to attach inner wall 422 at a substantially fixed radial and/or axial position within outer wall 420. In some examples, impellers 428 may comprise a thermally conductive material, e.g., a metal, a thermally conductive carbon fiber, a thermally conductive polymeric material including thermally conductive particles, a thermally conductive woven or nonwoven material including thermally conductive polymers, a thermally conductive composite material, or the like.

In some examples, outer wall 420 is configured to conduct heat between permanent magnets 414 and inner surface 426. For example, outer wall 420 may be a thermal conductor, and permanent magnets 414 may be in thermal communication with outer wall 420. Inner surface 426 may be configured to transfer heat to a fluid within fluid flow path 424. For example, a fluid within flow path 424 may be in thermal communication with inner surface 426, and inner surface 426 may transfer heat, e.g., via any of conduction, radiation, convection, and the like, to the fluid. In some examples, the fluid may not be moving within fluid flow path 424, and in other examples, the fluid may be flowing within fluid flow path 424.

In some examples, impellers 428 are also configured to conduct heat, e.g., impellers 428 may be thermal conductors. In some examples, impellers 428 and/or a radially outer surface 456 of inner wall 422 may be configured to increase the surface area of inner surface 426 and transfer heat to a fluid within fluid flow path 424. For example, impellers may be affixed to, and in thermal communication with, outer wall 420 and inner surface 426. Thermal energy and/or heat may conduct between outer wall 420 and impellers 428, and the thermal energy of outer wall 420 may conduct and/or radiate from the surfaces of impellers 428 in addition to surface 428. In other words, impellers 428 may be affixed to, or integral with, outer wall 420 and the surface area of the surfaces of impellers 428 add to the surface area of surface 420. In some examples, inner wall 422 may be affixed to, or integral with, impellers 428, and may be in thermal communication/contact with impellers 428 and the surface area of radially outer surface 456 may add to the surface area of surface 420. Rotor core 412 may be configured such that thermal energy and/or heat may conduct between any of outer wall 420, impellers 428, an inner wall 420. In other words, heat generated in components of rotor assembly 404 (e.g., via conversion of electrical energy, friction, or any other source of heating of the components) may be conducted to outer wall 420, impellers 428, and inner wall 420, and the heat may be transferred to fluid within fluid flow path 424, e.g., via conduction by being in thermal contact with the fluid at inner surface 426, radially outer surface 456, and the surfaces of impellers 428. In other words, the surface area configured to be in contact with a fluid within fluid flow path 424 and configured to transfer thermal energy to the fluid within fluid flow path 424 may comprise any or all of inner surface 426, radially outer surface 456, and the surfaces of impellers 428. Additionally, impellers 428 may be further configured to stiffen and/or support inner wall 422, e.g., provide mechanical support for the double-walled rotor core 412. In some examples, inner wall 422 may be attached to, fixed by, or integral with outer wall 420 via impellers 428, e.g., impellers 428 are configured to both cause a fluid within fluid flow path 424 to move (add consequently fluid within fluid flow path 425 to move as well) and to support/attach inner wall 422 to outer wall 420 to form the double-wall and define fluid flow path 424.

Rotor core 412 is configured to rotate within stator 402, e.g., within volume 408 defined by stator housing 406. Impellers 428 are configured to cause a fluid to move within fluid flow path 424, e.g., when rotor core 412 rotates within stator 420. Impellers 428 may drive the fluid to flow axially and radially outwards within flow path 424 and along inner surface 406. Impellers 428 may cause the fluid to be drawn into fluid flow path 424 via fluid inlet 436. In some examples, fluid inlet 436 may be a lumen within a drive shaft connected to rotor assembly 404 and in fluidic communication with fluid flow path 424, and in some examples fluid inlet 436 may be a lumen within rotor assembly 404 or rotor core 412 and in fluidic communication with fluid flow path 424. In some examples, fluid inlet 436 may be a aperture of rotor core 412 in fluidic communication with fluid flow path 424.

In some examples, rotor core 412 includes a rotor core exit vent 430 in fluid communication with fluid flow path 424 and configured to allow a fluid to flow between fluid flow path 424 and a volume outside of fluid flow path 424, e.g., volume 408 in the example shown. The fluid may then flow out from volume 408 via stator exit vent 434 to a volume outside of stator 402, along with any heat transferred to the fluid from rotor core 412 and/or stator 402.

For example, when electric machine 400 is operating and rotor assembly 412 rotates about longitudinal axis A, impellers 428 may cause a fluid within fluid flow path 424 to move in a direction within fluid flow path 424 as indicated by the arrows in FIG. 4. The movement of the fluid may cause a pressure drop within fluid flow path 424, drawing in more fluid from fluid inlet 436. Flow path 424 may then guide the fluid within fluid flow path 424 and along inner surface 426 and radially outer surface 456. The fluid may be in thermal contact with inner surface 426, radially outer surface 456, and the surfaces of impellers 428, and may receive thermal energy from those surfaces, e.g., via conduction.

The fluid may exit fluid flow path 424 via rotor core exit vent 430 into volume 408. Stator 402 and rotor assembly 404 may define a fluid flow path 425 within volume 408, fluid path 425 configured to guide the fluid along an inner surface 466 of an inner stator wall 464 of stator housing 406, and along components of rotor assembly 404, e.g., surfaces of magnets 414, metallic banding 428, and outer surfaces 468 of rotor core 412, and may receive thermal energy from those surfaces, e.g., via conduction. The fluid may then exit stator 402 via stator exit vents 434.

In some examples, fluid flow path 425, defined by rotor assembly 404 and stator 402, may be configured to remove heat from conductors 448. For example, stator 402 may be configured to transfer heat generated by conductors 448 to at least a portion of stator housing 406, e.g., an inner stator wall 464 configured to separate volume 410 and volume 408. Inner stator wall 464 may be comprised of a thermally conductive material, e.g., a metal, a thermally conductive carbon fiber, a thermally conductive polymeric material including thermally conductive particles, a thermally conductive woven or nonwoven material including thermally conductive polymers, a thermally conductive composite material, or the like. In some examples, stator 402 may include a thermally conductive fluid within volume 410 configured to transfer thermal energy/heat from conductors 448 to inner stator wall 464. Fluid flow path 425 may be configured to guide a fluid along inner surface 466 of inner stator wall 464. The fluid may be configured to receive thermal energy from inner surface 466 surfaces, e.g., via conduction, thereby receiving heat generated by conductive 448 and carrying that heat out stator exit vent 434.

In some examples, impellers 428 may cause a fluid within fluid flow path 424 to move in a direction within fluid flow path 424 opposite the direction indicated by the arrows in FIG. 4. For example, impellers 428 may cause the fluid in a direction such that the fluid may be draw into fluid flow path 425 via stator exit vent 434, from fluid flow path 425 to fluid flow path 424 via rotor core exit vent 430, and out of fluid flow path 424 via fluid inlet 436. Fluid flow paths 425 and 424 may be configured to guide the fluid along the surfaces as described above, only in the opposite direction, and to remove heat via thermal conduction/communication with those surfaces.

In some examples, electric machine 400 may not include impellers 428. For example, inner wall 422 may be integral with outer wall 420 to define fluid flow path 424, or inner wall 422 may be affixed radially within outer wall 420 to define fluid flow path 424 via support structures that are not impellers. In some examples, an external fluid motive force may be provided, e.g., to cause a fluid to move within fluid flow paths 424 and 425 in the direction indicated by the arrows or opposite the direction indicated by the arrows. For example, a fluid pump, fan, or the like, may be in fluid communication with one or both of fluid flow paths 424 and 425, e.g., via fluid inlets 436 and/or stator vent exit vents 434.

In the example shown, electric machine 400 may be symmetric about radial axis B (axis B is illustrated as a broken dashed line for the sake of clarity of elements illustrated within electric machine 400). In some examples, conductors 448 on side D of electric machine may be operated/driven independently from conductors 448 on side E of electric machine 400. Magnets 414 on side D may interact with conductors 448 on side D independently of magnets 414 and conductors on side E. For example, if one or more conductors 448 or magnets 414 on side D of electric machine 400 fail such that conductors 448 and magnets 414 on side D are not able to convert between electrical and mechanical energy, e.g., via rotating rotor core 412, the magnets 414 and conductors 468 on side E may still function and not be susceptible to the same cause of failure on side D. In other examples, electric machine 400 may not be symmetric about a radial axis.

In the example shown, fluid flow paths 424 and 425 may be configured to guide fluid from fluid inlet 436 on either side, D or E, of electric machine 400 to stator exit vent 434 on either side of, D or E, of electric machine 400, e.g., when impellers 428 are configured to cause the fluid to move as indicated by the arrows. Similarly, fluid flow paths 424 and 425 may be configured to guide fluid from stator exit vent 436 on either side, D or E, of electric machine 400 to fluid inlet 436 on either side of, D or E, of electric machine 400, e.g., when impellers 428 are configured to cause the fluid to move opposite the direction indicated by the arrows.

In the example shown, electric machine 400 includes two fluid inlets 436, one rotor core exit vent 430, and two stator exit vents 434, however, electric machine 400 may have fewer or more of each of fluid inlets 436, rotor core exit vent 430, and stator exit vents 434. For example, rotor core 412 may include additional rotor core exit vents 430 at one or more other circumferential positions about outer wall 420, and stator housing 406 may include just a single stator exit vent 434 on either side D or side E, or a plurality of stator exit vents at differing circumferential or radial positions on one or both of sides D or E.

Figure 5:
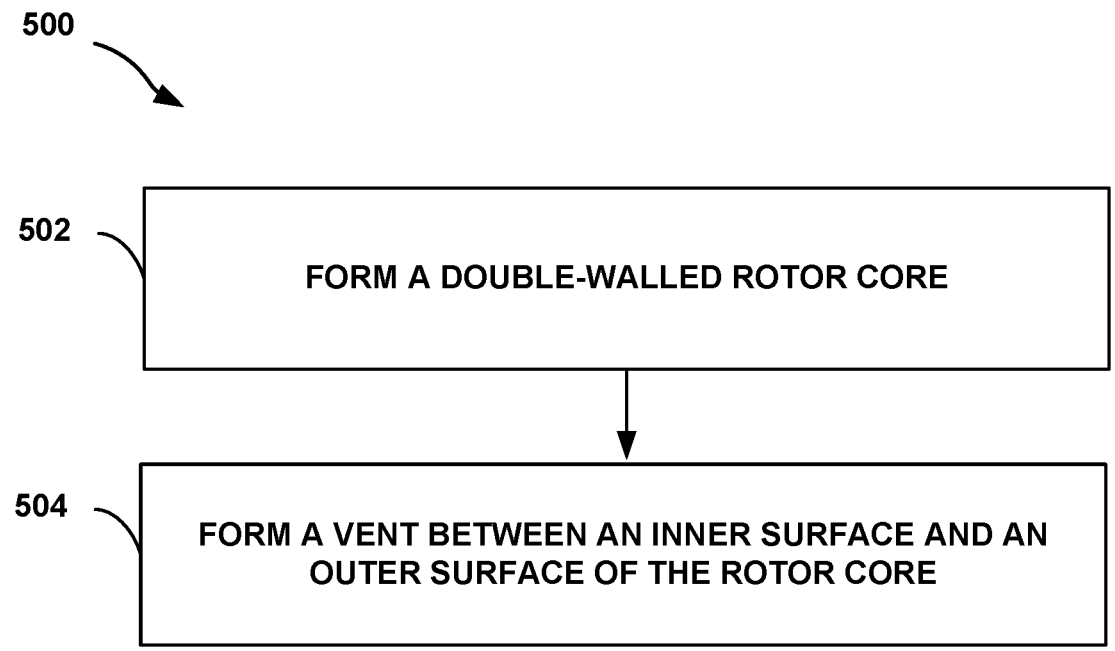
FIG. 5 is a flowchart of an example technique for making a rotor assembly, in accordance with one or more techniques of this disclosure.

FIG. 5 is a flowchart of an example technique 500 for making a rotor assembly, in accordance with one or more techniques of this disclosure. Although described with reference to electric machine 400 and rotor assembly 404 of FIG. 4, the technique may be used to form any suitable rotor assembly including an inner rotor core wall radially within an outer rotor core wall and defining a fluid flow path between the inner and outer rotor core walls.

A rotor assembly fabricator, e.g., a person and/or rotor assembly machine, may form a double-walled rotor core (502). For example, the rotor assembly fabricator may attach inner wall 422 to an inner surface 426 of a rotor core 412, e.g., to inner surface 426 of outer wall 420, via one or more impellers 428. The rotor assembly fabricator may attach inner wall 422 radially within outer wall 420 to define fluid flow path 424 configured to guide a fluid along inner surface 426 of rotor core 412, e.g., inner surface 426 of outer wall 420.

The rotor assembly fabricator may form a vent between an inner surface and an outer surface of the rotor core, wherein the vent through is in fluid communication with the fluid flow path (504). For example, the rotor assembly fabricator may form one or more rotor core exit vents 430 in outer wall 420 between inner surface 426 and outer surface 468 such that rotor core exit vents 430 are in fluid communication with fluid flow path 424 and fluid flow path 425.

The following examples may illustrate one or more aspects of the disclosure:

Example 1: A rotor assembly comprising: a rotor core having an axial length and configured to rotate about a longitudinal axis, the rotor core comprising: a first wall; and a second wall radially within the first wall and defining a fluid flow path configured to guide a fluid along an inner surface of the first wall.

Example 2: The rotor assembly of example 1, further comprising an impeller between the inner surface of the first wall and an outer surface of the second wall, where the impeller is configured to cause a fluid to move within the fluid flow path.

Example 3: The rotor assembly of example 2, wherein the impeller is further configured to stiffen the rotor core.

Example 4: The rotor assembly of example 3, wherein the impeller is further configured to affix the second wall radially within the first wall.

Example 5: The rotor assembly of any one of examples 1 through 4 further comprising: a permanent magnet disposed radially outwards of an outer surface of the first wall, wherein the first wall is configured to conduct heat between the permanent magnet and the inner surface of the first wall, wherein the inner surface of the first wall is configured to transfer heat to a fluid within the fluid flow path.

Example 6: The rotor assembly of example 5, wherein the impeller is in thermal contact with the inner surface of the first wall and is further configured increase a surface area of the inner surface of the first wall and transfer heat to a fluid within the fluid flow path.

Example 7: The rotor assembly of any one of examples 1 through 6, wherein the rotor core is configured to rotate within a stator, wherein the rotor core comprises a rotor core exit vent in fluid communication with the fluid flow path, wherein the stator comprises a stator exit vent configured to allow a fluid flowing within the fluid flow path to exit the rotor assembly and the stator.

Example 8: The rotor assembly of example 7, wherein the rotor assembly is configured to define, within the stator, the fluid flow path configured to guide a fluid along an inner surface of the stator from the rotor core exit vent to the stator exit vent.

Example 9: The rotor assembly of any one of examples 1 through 8, wherein the rotor core comprises a hollow shaft defining a lumen, wherein the lumen is in fluid communication with the fluid flow path and comprises a fluid inlet to the fluid flow path.

Example 10: An electric machine comprising: a stator defining a volume; and a rotor assembly configured to rotate within the volume; the rotor assembly comprising: a rotor core having an axial length and configured to rotate about a longitudinal axis, the rotor core comprising: a first wall; and a second wall radially within the first wall and defining a fluid flow path configured to guide a fluid along an inner surface of the first wall.

Example 11: The electric machine of example 10, further comprising: an impeller between the inner surface of the first wall and an outer surface of the second wall, where the impeller is configured to cause a fluid to move within the fluid flow path.

Example 12: The electric machine of example 11, wherein the impeller is further configured to stiffen the rotor core.

Example 13: The electric machine of example 12, wherein the impeller is further configured to affix the second wall radially within the first wall.

Example 14: The electric machine of any one of examples 10 through 13 further comprising: a permanent magnet disposed radially outwards of an outer surface of the first wall, wherein the rotor core is configured to conduct heat between the permanent magnet and the inner surface of the first wall, wherein the inner surface of the first wall is configured to transfer heat to a fluid flowing within the fluid flow path.

Example 15: The rotor assembly of example 14, wherein the impeller is in thermal contact with the inner surface of the first wall and is further configured increase a surface area of the inner surface of the first wall and transfer heat to a fluid flowing within the fluid flow path.

Example 16: The rotor assembly of any one of examples 10 through 15, wherein the rotor core comprises a rotor core exit vent in fluid communication with the fluid flow path, wherein the stator comprises a stator exit vent configured to allow a fluid flowing within the fluid flow path to exit the rotor assembly and the stator.

Example 17: The rotor assembly of example 16, wherein the rotor assembly is configured to define, within the stator, a fluid flow path configured to guide a fluid along an inner surface of the stator between the rotor core exit vent and the stator exit vent.

Example 18: The rotor assembly of any one of examples 10 through 17, wherein the rotor core comprises a hollow shaft defining a lumen, wherein the lumen is in fluid communication with the fluid flow path and comprises a fluid inlet to the fluid flow path.

Example 19: A method of making a rotor assembly comprising: attaching a wall to an inner surface of a rotor core via an impeller, wherein the wall defines a fluid flow path configured to guide a fluid along an inner surface of the rotor core.

Example 20: The method of example 19, further comprising: forming a vent through hole between an inner surface and an outer surface of the rotor core, wherein the vent through is in fluid communication with the fluid flow path.

Various examples have been described. These and other examples are within the scope of the following claims.

What is claimed is:

1. A rotor assembly comprising:
    a rotor core having an axial length and configured to rotate about a longitudinal axis, the rotor core comprising:
        a first wall;
        a second wall radially within the first wall and defining a fluid flow path configured to guide a fluid along an inner surface of the first wall; and
    an impeller between the inner surface of the first wall and an outer surface of the second wall, wherein the impeller is configured to impart a radial force on the fluid that drives the fluid radially outwards from the longitudinal axis within the fluid flow path.

2. The rotor assembly of claim 1, wherein the impeller is further configured to stiffen the rotor core.

3. The rotor assembly of claim 2, wherein the impeller is further configured to affix the second wall radially within the first wall.

4. The rotor assembly of claim 1 further comprising:
    a permanent magnet disposed radially outwards of an outer surface of the first wall, wherein the first wall is configured to conduct heat between the permanent magnet and the inner surface of the first wall, wherein the inner surface of the first wall is configured to transfer heat to a fluid within the fluid flow path.

5. The rotor assembly of claim 4, wherein the impeller is in thermal contact with the inner surface of the first wall and is further configured increase a surface area of the inner surface of the first wall and transfer heat to a fluid within the fluid flow path.

6. The rotor assembly of claim 1, wherein the rotor core is configured to rotate within a stator, wherein the rotor core comprises a rotor core exit vent in fluid communication with the fluid flow path, wherein the stator comprises a stator exit vent configured to allow a fluid flowing within the fluid flow path to exit the rotor assembly and the stator.

7. The rotor assembly of claim 6, wherein the rotor assembly is configured to define, within the stator, the fluid flow path configured to guide a fluid along an inner surface of the stator from the rotor core exit vent to the stator exit vent.

8. The rotor assembly of claim 1, wherein the rotor core comprises a hollow shaft defining a lumen, wherein the lumen is in fluid communication with the fluid flow path and comprises a fluid inlet to the fluid flow path.

9. An electric machine comprising:
    a stator defining a volume; and
    a rotor assembly configured to rotate within the volume; the rotor assembly comprising:
        a rotor core having an axial length and configured to rotate about a longitudinal axis, the rotor core comprising:
        a first wall;

a second wall radially within the first wall and defining a fluid flow path configured to guide a fluid along an inner surface of the first wall; and an impeller between the inner surface of the first wall and an outer surface of the second wall, wherein the impeller is configured to impart a radial force on the fluid that drives the fluid radially outwards from the longitudinal axis within the fluid flow path.

10. The electric machine of claim 9, wherein the impeller is further configured to stiffen the rotor core.

11. The electric machine of claim 10, wherein the impeller is further configured to affix the second wall radially within the first wall.

12. The electric machine of claim 9 further comprising:
a permanent magnet disposed radially outwards of an outer surface of the first wall, wherein the rotor core is configured to conduct heat between the permanent magnet and the inner surface of the first wall, wherein the inner surface of the first wall is configured to transfer heat to a fluid flowing within the fluid flow path.

13. The rotor assembly of claim 12, wherein the impeller is in thermal contact with the inner surface of the first wall and is further configured increase a surface area of the inner surface of the first wall and transfer heat to a fluid flowing within the fluid flow path.

14. The rotor assembly of claim 9, wherein the rotor core comprises a rotor core exit vent in fluid communication with the fluid flow path, wherein the stator comprises a stator exit vent configured to allow a fluid flowing within the fluid flow path to exit the rotor assembly and the stator.

15. The rotor assembly of claim 14, wherein the rotor assembly is configured to define, within the stator, a fluid flow path configured to guide a fluid along an inner surface of the stator between the rotor core exit vent and the stator exit vent.

16. The rotor assembly of claim 9, wherein the rotor core comprises a hollow shaft defining a lumen, wherein the lumen is in fluid communication with the fluid flow path and comprises a fluid inlet to the fluid flow path.

17. A method of making a rotor assembly, the method comprising:
attaching a wall to an inner surface of a rotor core via an impeller,
wherein the wall defines a fluid flow path configured to guide a fluid along an inner surface of the rotor core,
wherein the impeller is configured to impart a radial force on the fluid that drives the fluid radially outwards from a longitudinal axis of the rotor assembly within the fluid flow path.

18. The method of claim 17, further comprising:
forming a vent through hole between an inner surface and an outer surface of the rotor core, wherein the vent through is in fluid communication with the fluid flow path.

* * * * *